(12) United States Patent
Chao

(10) Patent No.: US 7,836,552 B2
(45) Date of Patent: Nov. 23, 2010

(54) HOLD-DOWN SUPPORT STRUCTURE OF HINGE

(75) Inventor: Po-Tsun Chao, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 277 days.

(21) Appl. No.: 11/878,187

(22) Filed: Jul. 23, 2007

(65) Prior Publication Data

US 2008/0184528 A1 Aug. 7, 2008

(30) Foreign Application Priority Data

Feb. 6, 2007 (TW) .............................. 96104231 A

(51) Int. Cl.
    *E05C 17/64* (2006.01)
(52) U.S. Cl. .............................. 16/342; 16/337; 16/356; 16/254; 16/260; 16/267; 16/270
(58) Field of Classification Search ................... 16/342, 16/340, 337, 355, 356, 386, 387, 348, 349, 16/363, 374, 377, 277, 280, 285, 307, 308, 16/306, 293, 295, 254, 260, 262, 267, 270
    See application file for complete search history.

(56) References Cited

U.S. PATENT DOCUMENTS

| | | | | |
|---|---|---|---|---|
| 684,074 | A | * | 10/1901 | Luppert ........................ 16/342 |
| 4,617,699 | A | * | 10/1986 | Nakamura ..................... 16/262 |
| 4,785,500 | A | * | 11/1988 | Langridge ..................... 16/297 |
| 5,251,949 | A | * | 10/1993 | Miller et al. .................. 16/297 |
| 5,632,066 | A | | 5/1997 | Huong |
| 6,256,836 | B1 | * | 7/2001 | Lin et al. ....................... 16/263 |
| 6,470,532 | B2 | | 10/2002 | Rude |
| 6,671,929 | B1 | | 1/2004 | Lu |
| 6,711,782 | B1 | | 3/2004 | Su |
| 6,721,994 | B2 | * | 4/2004 | Bowman et al. ............... 16/262 |
| 6,868,582 | B2 | | 3/2005 | Lu et al. |
| 7,207,086 | B2 | * | 4/2007 | Yang ............................ 16/366 |
| 2007/0169314 | A1 | | 7/2007 | Lee et al. |

FOREIGN PATENT DOCUMENTS

| TW | 293654 | 7/2006 |
|---|---|---|
| TW | 259348 | 8/2006 |

OTHER PUBLICATIONS

Communication from the Taiwan Patent Office dated Nov. 17, 2009 with regard to the counterpart Taiwan Application 096104231.

* cited by examiner

*Primary Examiner*—Victor Batson
*Assistant Examiner*—Jeffrey O'Brien

(57) ABSTRACT

A hold-down support structure is coupled to a stem of a pintle to form a hinge, and includes a support board and a sleeve. The support board has a support section forming a support face. The sleeve includes first and second brackets. When the sleeve is mounted to the support board, a stem receiving space is defined by by the support board and the first and second brackets. The stem is inserted into the stem receiving space and an outer circumferential surface of the stem is subject to constraint by the support face of the support board and the resilient retention forces respectively applied by the first and second brackets symmetrically in directions toward the support face so that a predetermined rotational friction is induced between the outer circumferential surface of the stem and the inside surfaces of the first and second brackets.

7 Claims, 5 Drawing Sheets

HOLD-DOWN SUPPORT STRUCTURE OF HINGE

FIELD OF THE INVENTION

The present invention relates to a hinge, and in particular to a hold-down support structure of a hinge, which comprises a support board forming slots and a sleeve that forms mounting legs, which are coupled together to rotatably retain a stem of a pintle.

BACKGROUND OF THE INVENTION

Hinges have been widely used in various electronic devices and the conventional hinges that are currently available often comprise a support structure forming a sleeve to rotatably accommodate a shaft of a pintle structure. An example application of the hinges is a notebook computer, which includes an enclosure and a liquid crystal display coupled together by a hinge to allow enclosure of the notebook computer to be flipped up or closed down. Other applications of the hinge includes mobile phones, personal digital assistants (PDAs), inspection/testing equipment, and positioning systems, which often incorporate a hinge or hinges.

A conventional hinge comprises a carrier member having an edge forming a sleeve structure to receive a shaft of a pintle structure therein. When the shaft of the pintle structure is operated and rotated, a rotational friction induced between an inside surface of the sleeve and an outside circumference of the shaft provides an operation torque for a subject device. To provide similar torque in both opening and closing the subject device to which the hinge is applied, the conventional hinge comprises forward-extending sleeve segment and a reversely-extending sleeve segment both mounted to the edge of the carrier member to form a dual-surrounding sleeve configuration.

To satisfy functional requirement of the hinges, a variety of designs for the hinges are known in the prior art references. An example of the prior art references includes U.S. Pat. No. 6,671,929, which discloses a hinge structure for a notebook computer, comprising two barrels coupled by a pintle. The barrel has a portion that is curved to form a collar for receiving and retaining the pintle. Further, U.S. Pat. No. 6,470,532 discloses a sleeve formed on a plate-like support and a board forming a bore is arranged beside the plate-like support. A hinge pin extends the sleeve of the plate-like support and the bore of the board. In U.S. Pat. No. 6,868,582, a computer hinge is disclosed, which comprises two stems each having an extension and coupled together by a sleeve. The extensions of the stems are respectively coupled to a computer and a liquid crystal display. In U.S. Pat. No. 6,711,782, a hinge that generates friction torques in opposite directions is disclosed, which comprises two fastening sections that are overlapped to enhance friction force.

A lot of known hinges having different structures are currently available in the market, but all these known hinge have certain drawbacks. Further, most of the known hinges consist of a support structure that is formed by stamping as an integral part. Further, the support structure forms a sleeve to receive a pintle therein to form a hinge. The hinge of the kind needs at least one support board that bears torque induced at connection of two members. Thus, the support board has to have a large support face. This makes the hinge occupying a great amount of space in a device in which the hinge is applied and also causes negative visual effect on the overall appearance.

Further, the sleeve is often mechanically tough in resisting deformation. Thus, conventionally, the pintle is coupled to the sleeve by forcibly fitting an end of the pintle into the sleeve, usually with the aid of properly arranged jigs, after the pintle is put in correct alignment with the sleeve. Such an assembling process is time-consuming and offers only very poor passing rate of the final products for damages are easy to occur in both the sleeve and the pintle in case they are not properly aligned or they are subject to incorrect assembling steps. This often leads to complete waste of the whole hinge.

Thus, it is desired to have a hinge that overcomes the above drawbacks of the conventional hinge devices.

SUMMARY OF THE INVENTION

An objective of the present invention is to provide a hinge that is assembled by fitting to eliminate the drawbacks associated with the stamping process adopted for the conventional hinges.

Another objective of the present invention is to provide a hinge having a resilient sleeve that comprises two opposite brackets for applying adaptive resilient forces to self-compensate wear of the hinge.

A further objective of the present invention is to provide a hinge that has a fitting assembled support member can be assembled in a simple process, wherein a stem of a pintle is coupled when the support member is assembled to thereby simplify the manufacturing process.

A further objective of the present invention is to provide a hinge that can be directly mounted to an enclosure of an electronic device or a fixture board whereby the hinge can be employed to selectively mount to a support board or a device enclosure to thereby enhance applications thereof.

According to the present invention, a solution to realize the above addressed objectives resides in that a sleeve structure is formed by opposite brackets so that when the sleeve is mounted to a support board, the support board and two brackets together form the sleeve structure to provide a stem receiving space. A stem is received in the stem receiving space and an outer circumferential surface of the stem is subject to constrain by a support face of the support board and is further subject to resilient retention forces applied by the opposite brackets in a symmetric manner and in directions toward the support face so as to induce a predetermined rotational friction between the outer circumferential surface of the stem and inside surfaces of the opposite brackets. The sleeve structure may alternatively comprise a forward-extending sleeve segment and a reversely-extending sleeve segment closely adjacent to the forward-extending sleeve segment. The forward-extending sleeve segment extends in a clockwise circumferential direction to form a C-shaped circumferential sleeve and the reversely-extending sleeve segment extends in a counterclockwise circumferential direction to form a C-shaped circumferential sleeve so as to provide a predetermined rotational friction between the outer circumferential surface of the shaft and inside surfaces of the sleeves.

The hinge of the present invention is formed by fitting and no stamping that is employed in the conventional hinges is needed. Thus, when the present invention is practiced in devices that have different requirements, the hinge of the present invention can be assembled in different forms or can be directly mounted to the device enclosure or fixture board. Further, no jig-assisted force fitting operation is needed to forcibly drive the pintle into the sleeve and thus, damage to the parts can be alleviated and the passing rate of manufacturing can be enhanced. In addition, the sleeve features resilient adaptability, which besides applying a resilient retention force to the pintle for positioning, can automatically compensate wearing between the sleeve and the pintle after a long term operation. Since the support structure is formed of separate parts, in case of failure of one of the parts, it only needs to replace the broken part and discarding the whole hinge is no longer necessary.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
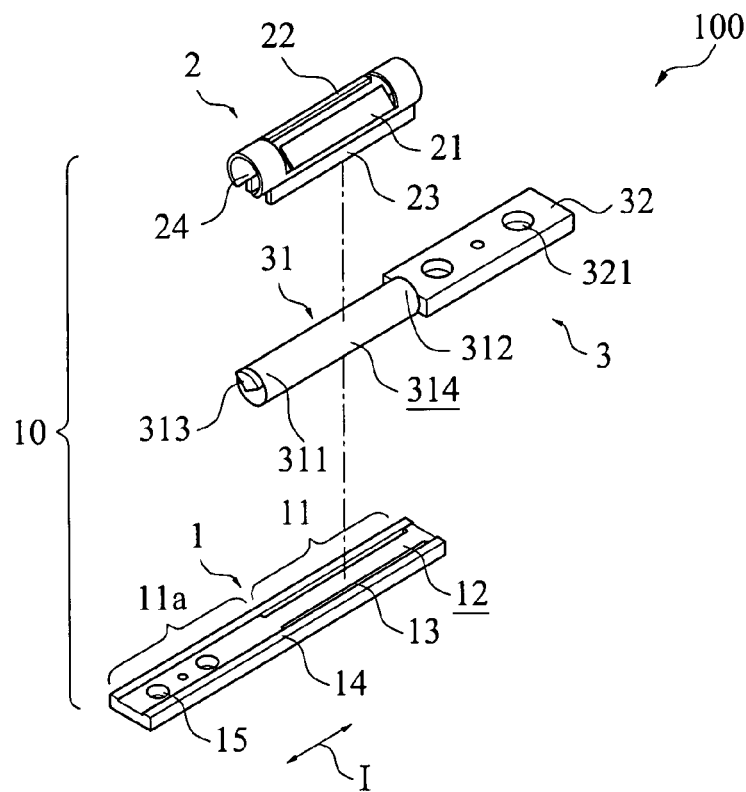
FIG. 1 illustrates an exploded view of a hinge constructed in accordance with a first embodiment of the present invention.
Figure 2:
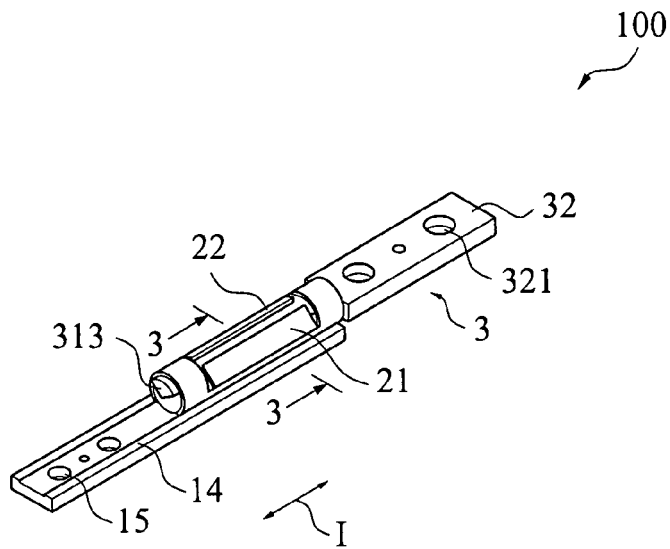
FIG. 2 illustrates a perspective view of the hinge of the present invention in an assembled form.

With reference to the drawings and in particular to FIG. 1, which illustrates an exploded view of a hinge, generally designated at 100, constructed in accordance with a first embodiment of the present invention, and FIG. 2, which illustrates a perspective view of the hinge 100 of the present invention in an assembled form, the hinge 100 of the present invention comprises a hold-down support structure 10 to which a stem 31 of a pintle 3 is rotatably coupled to form the hinge 100. The hold-down structure 10 comprises a support board 1 and a cylindrical sleeve 2.

The support board 1 has a board-like structure extending along a horizontal datum plane I and forming a support section 11 having a top surface serving as a support face 12. Two slots 13, which are parallel to and spaced from each other, are defined in and substantially extensive along the support section 11.

The cylindrical sleeve 2 comprises first and second brackets 21, 22, which are opposite to each other, and at least one mounting leg 23 extending in a downward direction. Two mounting legs 23 are provided in the illustrated embodiment and are fit into the slots 13 of the support board 1, respectively to mount the sleeve 2 to the support section 11 of the support board 1, whereby a sleeve structure is formed by the support section 11 of the support board 1 and the first and second brackets 21, 22 of the sleeve 2 and defines a stem receiving space 24 for receiving the stem 31 of the pintle 3.

The pintle 3 comprises the stem 31 and an end plate 32. The stem 31 has a free end 311 and a mounting end 312 fixed to the end plate 32. Preferably, the free end 311 of the stem 31 forms a pawl 313 whereby when the stem 31 is received in the stem receiving space 24 of the sleeve 2, the pawl 313 of the free end 311 of the stem 31 functions to prevent the stem 31 from undesired separation from the sleeve 2.

Figure 3:
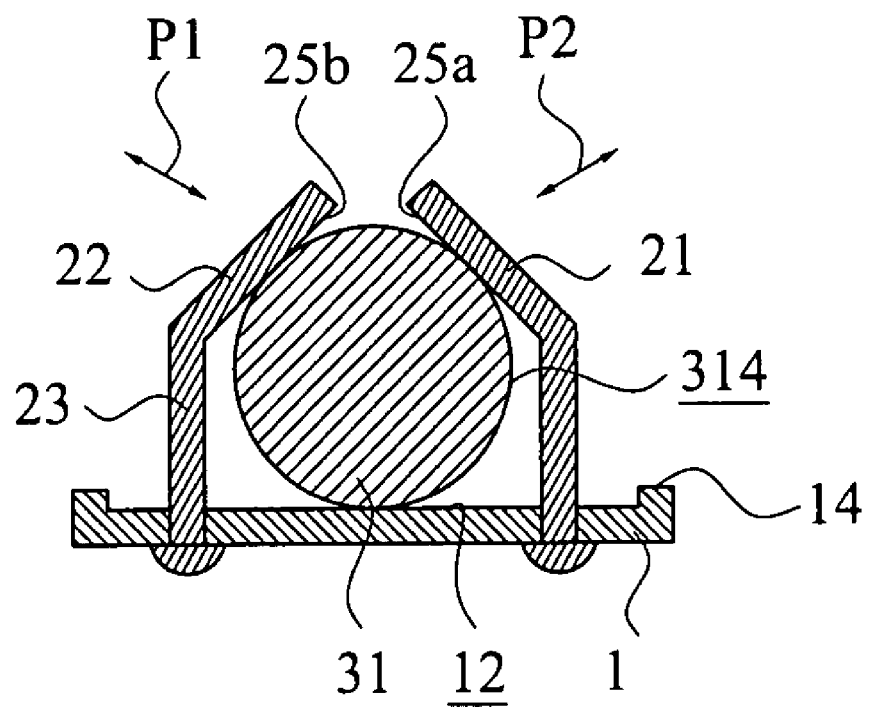
FIG. 3 is a cross-sectional view taken along line 3-3 of FIG. 2.

Also referring to FIG. 3, when the free end 311 of the stem 31 of the pintle 3 is fit into the stem receiving space 24 of the sleeve 2, an outer circumferential surface 314 of the stem 31 is subject to constraint by the support face 12 of the support section 11 of the support board 1 and is further subject to resilient retention forces P1, P2, which are applied, substantially in a symmetric manner and in directions toward the support face 12 of the support section 11, to the outer circumferential surface 314 of the stem 31 by the first and second brackets 21, 22, respectively, whereby a predetermined rotational friction is induced between the outer circumferential surface 314 of the stem 31 and an inside surface 25a, 25b of each of the first and second brackets 21, 22 of the sleeve 2.

Preferably, a vertical flange 14 is formed on and extending along each of two opposite edges of the support board 1 to enhance mechanical strength of the support section 11 of the support board 1.

The support board 1 further comprises an extended section 11a extending from the support section 11. The extended section 11a forms at least one fastening hole 15 for receiving a fastener (not shown) extending therethrough to attach the hinge 100 to for example an enclosure of a notebook computer. The end plate 32 of the pintle 3 also forms a plurality of fastening holes 321 for receiving fasteners (not shown) extending therethrough respectively to attach the pintle 3 to for example a liquid crystal display of the notebook computer.

Figure 4:
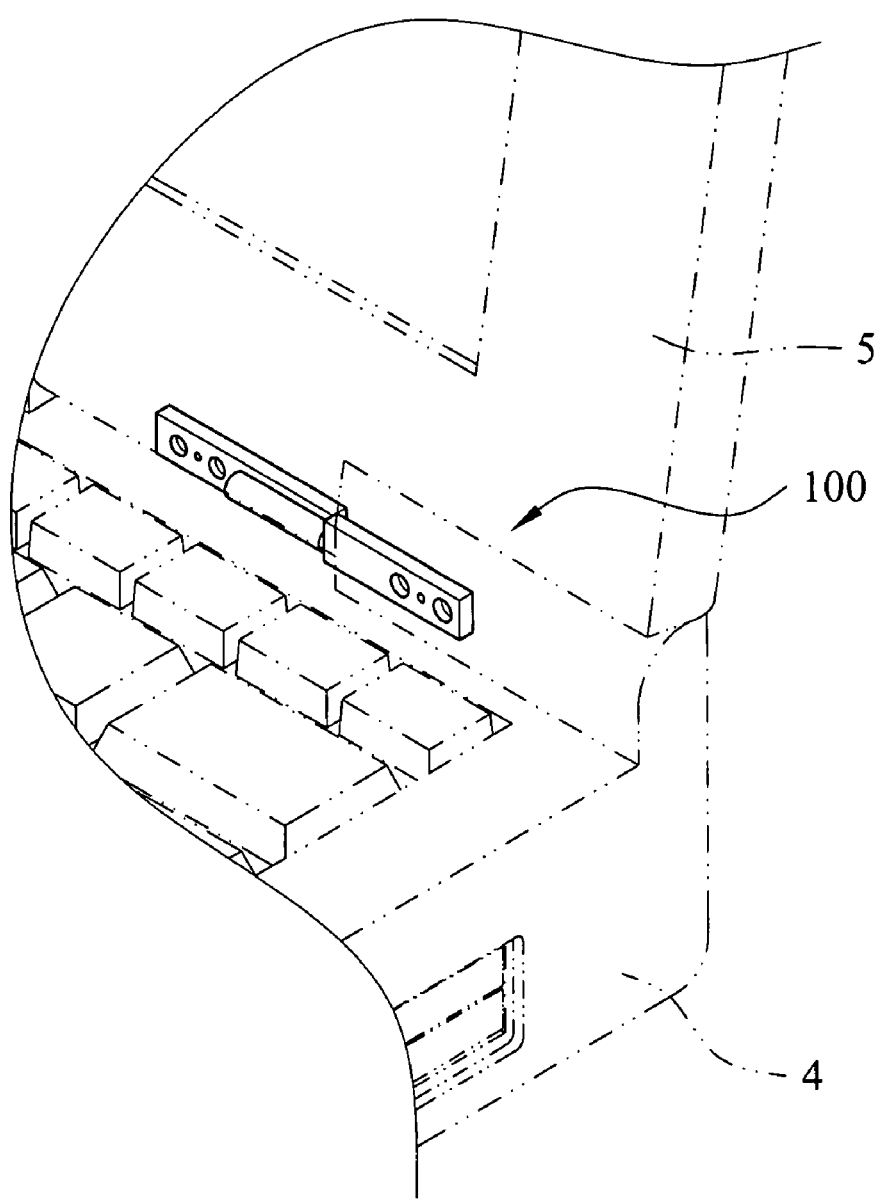
FIG. 4 shows an application of the hinge in accordance with the present invention in a notebook computer.

FIG. 4 illustrates an application of the present invention in a notebook computer, wherein the hinge 100 in accordance with the present invention is coupled between an enclosure 4 and a liquid crystal display 5 of a notebook computer. As such, when the liquid crystal display 5 is operated to flip up or close down to the enclosure 4 by operation of the hinge 100 of the present invention.

As discussed previously, the mounting legs 23 that extend from the sleeve 2 can be fit into and thus mounted to the slots 13 defined in the support section 11 of the support board 1. In accordance with the present invention, the mounting legs 23 can be further secured to the slots 13 of the support section 11 of the support board 1 by riveting. Alternatively, the mounting legs 23 can be further secured to the slots 13 of the support section 11 of the support board 1 by means of welding. The support board 1 can be made as a separate support for readily selectively mounting to a desired fixture or a selected device. Alternatively, the support board 1 can be omitted and the hinge can be directly mounted to the selected device.

Figure 5:
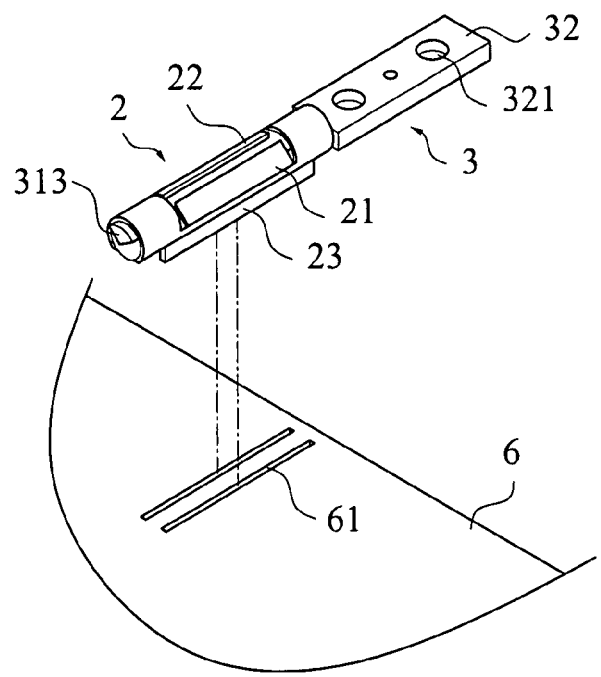
FIG. 5 illustrates a perspective view of the hinge of the present invention to be directly mounted to an enclosure of an electronic device.
Figure 6:
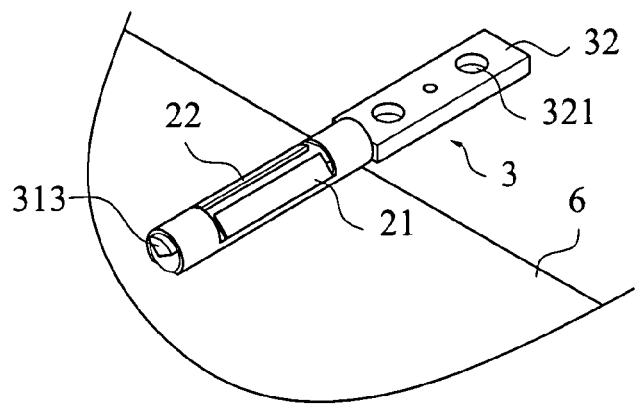
FIG. 6 illustrates a perspective view of the hinge of the present invention fixed to an enclosure of an electronic device by welding.

Referring now to FIG. 5, which illustrates a perspective view of the hinge 100 of the present invention that is to be directly mounted to an enclosure of an electronic device or a separate plate-like fixture, and FIG. 6, which shows a perspective view of the hinge 100 that is mounted to the enclosure of the electronic device already, the hinge 100 of the present invention comprises a hold-down support structure 10, which can be configured as a support structure that is directly mountable to a selected fixture or device, which can be a device enclosure 6 in which two slots 61 are defined. In accordance with the present invention, the sleeve 2, after being coupled with the stem 31 of the pintle 3, can be fixed in the slots 61 defined in the device enclosure 6 by riveting. Alternatively, the sleeve 2 can be fixed to the device enclosure 6 by means of the mounting legs 23 thereof with welding.

Figure 7:
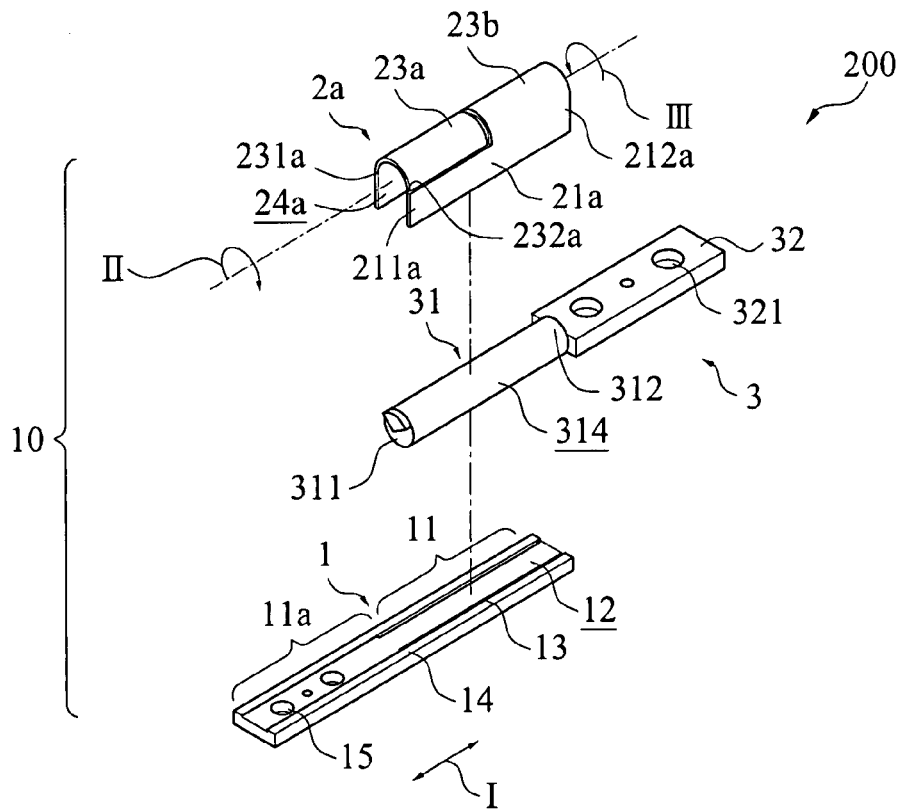
FIG. 7 shows an exploded view of a hinge constructed in accordance with a second embodiment of the present invention.
Figure 8:
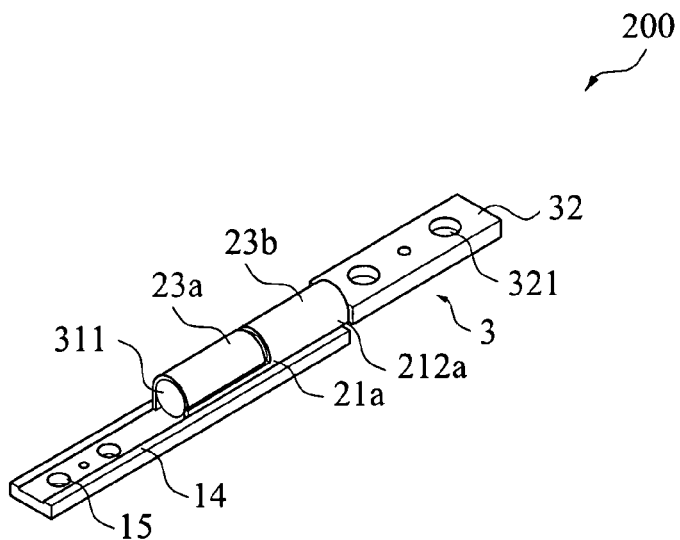
FIG. 8 shows a perspective view of the hinge of the second embodiment of the present invention in an assembled form.

FIG. 7 shows an exploded view of a hinge constructed in accordance with a second embodiment of the present invention, and generally designated at 200; and FIG. 8 shows a perspective view of the hinge 200 in an assembled form. The hinge 200 is constructed substantially similar to the hinge 100 of the previously embodiment. Thus, similar or identical parts of the two embodiments carry the same reference numerals. The hinge 200 is different from the hinge 100 in that the hinge 200 comprises a sleeve 2a, which is of an opposing circumferential sleeve structure. The sleeve 2a has at least one mounting leg 21a extending therefrom. The mounting leg 21a has a first end section 211a and a second end section 212a that is distant from and opposite to the first end section 211a.

The sleeve 2a comprises a forward-extending sleeve segment 23a and a reversely-extending sleeve segment 23b, which is closely adjacent to the forward-extending sleeve segment 23a. The forward-extending sleeve segment 23a has a mounting end 231a and an opposite free end 232a. The mounting end 231a is coupled to the mounting leg 21a to provide a fitting end, while the free end 232a extends in a clockwise circumferential extending direction II toward to the first end section 211a of the reversely-extending sleeve segment 23b to thereby form a C-shaped circumferential sleeve. Similarly, the reversely-extending sleeve segment 23b has a mounting end serving as a fitting end and a free end extending in a counterclockwise circumferential extending direction III to form a C-shaped circumferential sleeve. The reversely-extending sleeve segment 23b and the forward-extending sleeve segment 23a are together comprised of the sleeve 2a to receive the stem 31 of the pintle 3 thereby forming the hinge 200.

When the free end 311 of the stem 31 of the pintle 3 is fit into the sleeve structure 2a, an outer circumferential surface of the stem 31 is subject to constraint by the support face 12 of the support section 11 of the support board 1 so that a predetermined rotational friction is induced between the outer circumferential surface 314 of the stem 31 and an inside surface 24a of the sleeve 2a.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A hinge comprising:
a pintle comprising a stem having a free end;
a support board extending along a horizontal datum plane and comprising a planar support face and a first slot; and
a sleeve comprising a first bracket, a second bracket, and a first mounting leg, wherein the first and second brackets are arranged opposite to and facing each other;
wherein the sleeve is coupled to the support board by fitting the first mounting leg into the first slot, a stem receiving space is defined between the first bracket, the second bracket and the support face, and the free end of the stem is received into the stem receiving space; and
wherein the pintle, support board, and sleeve are arranged such that the stem directly contacts the first and second brackets and the support face such that the stem is subject to constraint by the support face, and is further subject to a first resilient retention force applied by the first bracket in a first direction toward the support face and a second resilient retention force applied by the second bracket in a second direction toward the support face, wherein the first and second directions are different and symmetrical relative to the stem, so as to induce a predetermined rotational friction between the stem and the first and second brackets.

2. The hinge as claimed in claim 1, wherein the support board further comprises a second slot extending lengthwise in a direction parallel to the first slot, and the sleeve further comprises a second mounting leg, wherein the sleeve is coupled to the support board by fitting the first mounting leg into the first slot and the second mounting leg into the second slot.

3. The hinge as claimed in claim 1, wherein the mounting leg is secured in the slot of the support board by riveting.

4. The hinge as claimed in claim 1, wherein the mounting leg is secured in the slot of the support board by welding.

5. The hinge as claimed in claim 1, wherein the stem has an end opposite to the free end thereof, the end forming an end plate in which at least one fastening hole is defined.

6. The hold-down support structure as claimed in claim 1, wherein at least one vertical flange is formed on and extends along an edge of the support board.

7. The hold-down support structure as claimed in claim 1, wherein the support board comprises an extended section extending therefrom and forming at least one fastening hole.

* * * * *